United States Patent [19]
Danielson et al.

[11] 3,861,950
[45] Jan. 21, 1975

[54] PROCESS OF DETACKIFYING RUBBER

[75] Inventors: Arthur C. Danielson, Royal Oak; James Ahnehmiller, Detroit, both of Mich.

[73] Assignee: Uniroyal, Inc., New York, N.Y.

[22] Filed: June 1, 1971

[21] Appl. No.: 148,948

[52] U.S. Cl. ............................... 117/139, 260/775
[51] Int. Cl. .............................................. B44d 1/22
[58] Field of Search ............ 117/139, 118; 260/775, 260/777, 778

[56] References Cited
UNITED STATES PATENTS

| | | | |
|---|---|---|---|
| 1,479,394 | 1/1924 | Meade | 117/118 |
| 1,817,323 | 8/1931 | Rice | 117/118 X |
| 1,928,988 | 10/1933 | Watkins | 117/118 |
| 2,132,268 | 10/1938 | Mallard | 117/115 |
| 2,752,317 | 6/1956 | Sudekum | 117/139 |

*Primary Examiner*—William D. Martin
*Assistant Examiner*—Sadie L. Childs
*Attorney, Agent, or Firm*—Bert J. Lewen, Esq.

[57] ABSTRACT

A method of detackifying rubber which comprises applying to rubber a solution of a compound having the formula RSCL, wherein R is a phenyl group which is substituted by an alkyl having from 1 to 8 carbon atoms and by an hydroxyl group.

2 Claims, No Drawings

PROCESS OF DETACKIFYING RUBBER

This invention relates to a process for detackifying unsaturated rubbers. Specifically, the invention teaches the use of an organic compound having the formula, RSCL, wherein R is as subsequently defined.

The tacky surfaces which form on vulcanized rubber articles are believed to be due to surface phenomenon, such as, oxidative degradation or polymer reversion. Such sticky surfaces are a detriment, especially where the rubber article must perform in highly automative operations or comes into temporary contact with other materials.

Specific areas where detackifying is desirable include the treatment of windshield wiper blades, conveyor belts, flexible extruder "take-offs," capstans or flexible bearings, and, in tire building, to reduce the surface tack on the turn-up bladders which become tacky from deposition of tacky materials from previous contact with uncured rubber compounds.

It is known that solutions of sulfenyl chloride can be used to eliminate tacky surfaces. Such compound, however, has an outstandingly bad odor and is unstable, and therefore undesirable for commercial use.

The compounds which are useful in the detackifying process of the instant invention have the formula, RSCL, wherein R is a substituted phenyl group having one to five substitutions. These substitutions may be halogenic, e.g. chloro; alkyl having 1 to 8 carbon atoms; or hydroxyl. Additionally, R may be a polymeric polysulfide group (polyalkylene disulfide or a polyalkylene ether polydisulfide) having a molecular weight from about 300 to 2000. Examples of preferred R groups are the alkyl phenol groups, specifically pentyl phenol, and the polyalkoxy polydisulfides having a molecular weight of about 300. The alkoxy group in the latter groups is generally an admixture of methoxy and ethoxy linkages.

The detackifying agent is dissolved in any common inert organic solvent having a boiling point of 35° to about 100°C. It is preferable, of course, that the solvent not be toxic or flammable. The preferred solvents are trichloroethylene and other conventional dry cleaning solvents. Gasoline may also be used. The solution preferably contains about 0.25 to 5 weight percent of the detackifying agent. It may be applied to rubber surfaces by brushing, spraying or any other convenient means.

The temperature of application is not important. For practical reasons, room temperature is preferred. Upon application, the solution is permitted to dry. The detackifying takes place in a matter of minutes and is complete prior to the evaporation of the solution.

Any cured unsaturated rubber compound may be advantageously treated in accordance with the process of the invention. Rubber compounds containing diene rubbers, such as, natural rubber and SBR and rubbers with low unsaturation such as butyl and chlorobutyl or EPDM are examples.

To illustrate more fully the instant invention, attention is directed to the following examples:

EXAMPLE 1

25 grams of Vultak No. 3 (a Trademark of Pennsalt Chemical Corporation for its solid pentylphenol disulfide) are dissolved in 250 ml. of trichloroethylene. Chlorine is bubbled in until a positive test is indicated on a moist piece of starch-iodide paper. The solution turns reddish-brown during the reaction. Dry air or nitrogen is bubbled through the solution to remove excess chlorine and HCl gas. The solution is then diluted to 2,500 ml. with trichloroethylene. The resulting solution does not have an unpleasant odor.

The solution is applied to a cured tacky turn-up bladder surface and the treated surface is no longer tacky when in contact with uncured rubber.

EXAMPLE 2

The polysulfide polymers, Viz. (Thiokol L.P.–2 or STH–4248) are chlorinated as described in EXAMPLE 1. Solutions containing 1 weight percent of the Thiokol sulfenyl chloride are brushed on surfaces of the turn-up bladder and allowed to dry. The solutions are applied to a cured tacky turn-up bladder surface and the treated surface is no longer tacky when in contact with uncured rubber. This example again shows the effectiveness of the invention in detackifying cure rubber articles.

Having thus described our invention, what we claim and desire to protect by Letters Patent is:

1. A method of detackifying rubber which comprises applying to said rubber a solution of a compound having the formula RSCL, wherein R is a phenyl group which is substituted by an alkyl having from 1 to 8 carbon atoms and by an hydroxyl group.

2. The process of claim 1 wherein said compound is pentyl phenol sulfenyl chloride.

* * * * *